July 20, 1954  E. L. CUDDINGTON  2,684,156
LIQUID FILTER AND DIRT TRAP
Filed April 4, 1952  2 Sheets-Sheet 1

INVENTOR
EDWARD L. CUDDINGTON
BY John N. Randolph
ATTORNEY

July 20, 1954  E. L. CUDDINGTON  2,684,156
LIQUID FILTER AND DIRT TRAP
Filed April 4, 1952  2 Sheets-Sheet 2
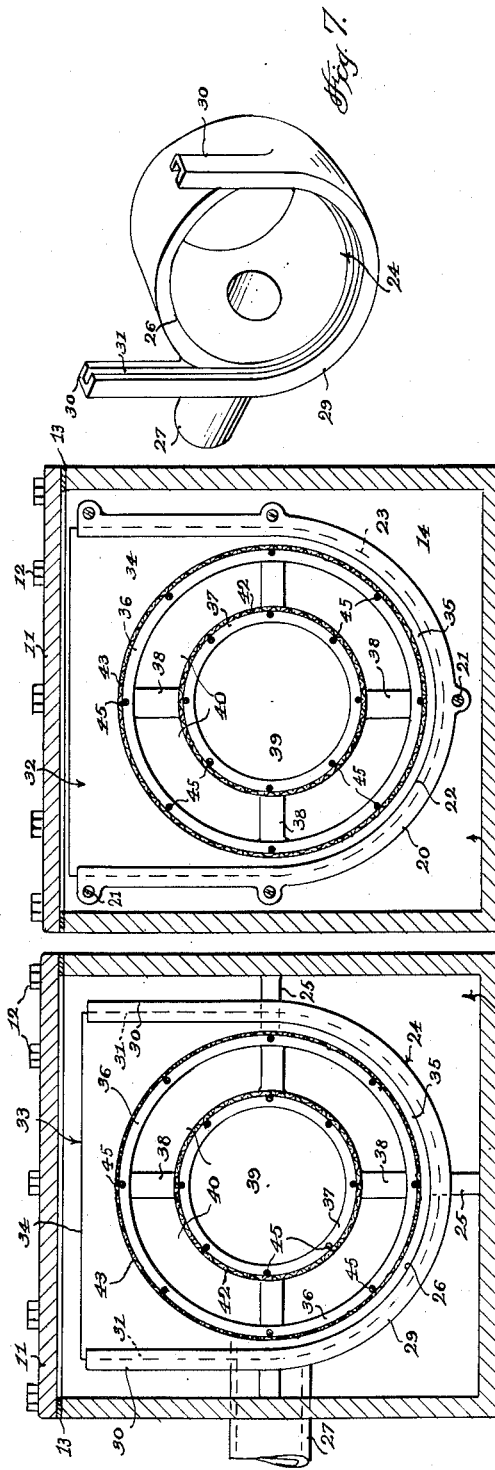
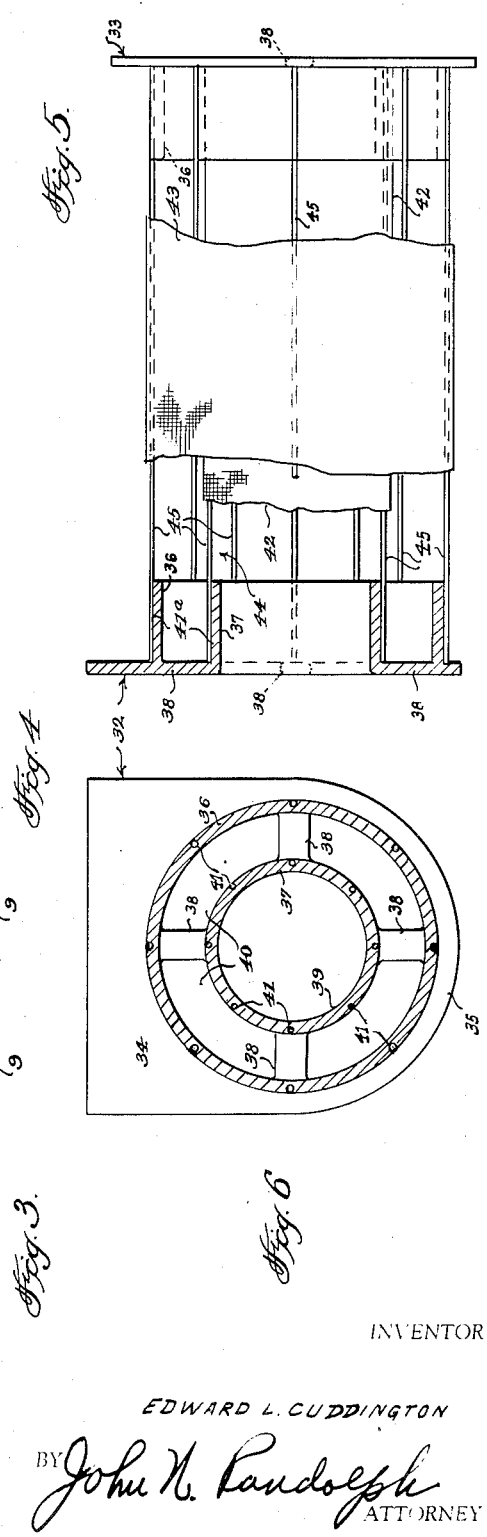
INVENTOR
EDWARD L. CUDDINGTON
BY John N. Randolph
ATTORNEY Patented July 20, 1954

2,684,156

UNITED STATES PATENT OFFICE 2,684,156

LIQUID FILTER AND DIRT TRAP

Edward L. Cuddington, Zillah, Wash.

Application April 4, 1952, Serial No. 280,623

3 Claims. (Cl. 210—165)

This invention relates to a novel filter and trap for liquids and which while primarily adapted for use in connection with irrigation and sprinkler systems for separating dirt and weed seeds from water being pumped through an irrigation system, is equally well adapted for use as a filter for other liquids for filtering out any foreign matter.

More particularly, it is an aim of the invention to provide a novel filter trap wherein dirt, weed seeds or other foreign matter may be separated from a liquid passing through a conduit or system in which the filter is interposed and wherein the trap may be opened at any time for cleaning the foreign matter therefrom.

Another object of the invention is to provide a filter capable of being readily dismantled for effectively cleaning the filtering elements thereof or for the replacement of such elements.

Various other objects and advantages of the invention will hereinafter become more fully apparent from the following description of the drawings, illustrating a presently preferred embodiment thereof, and wherein.

Figures 1, 2:
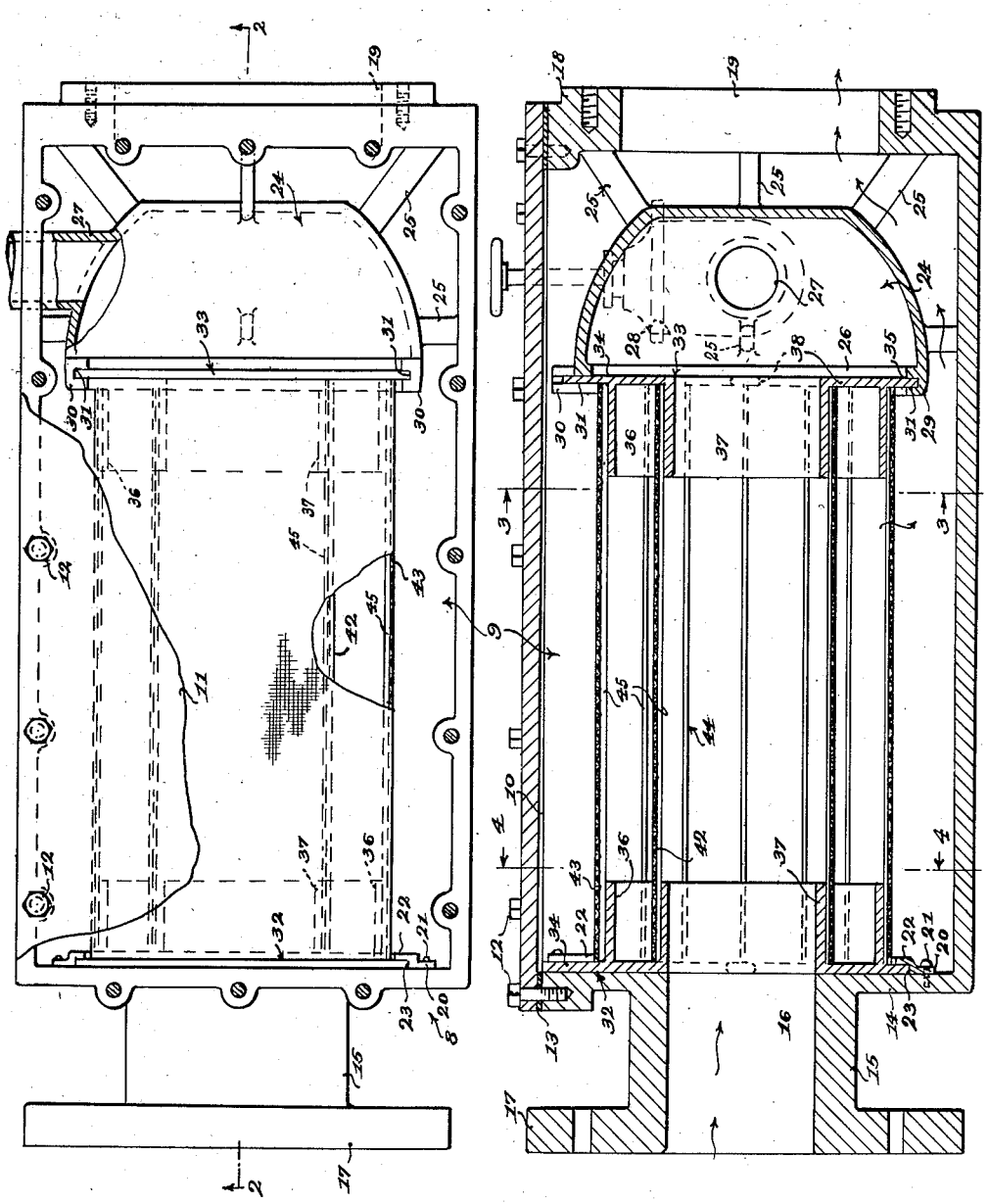
Figure 1 is a top plan view, partly broken away and partly in section of the filter and trap.
Figure 2 is a longitudinal sectional view thereof taken substantially along a plane as indicated by the line 2—2 of Figure 1.

Figures 3 and 4 are cross sectional views of the filter and trap taken substantially along planes as indicated by the lines 3—3 and 4—4, respectively, of Figure 2;

Figure 5 is a fragmentary side elevational view partly broken away and partly in section of a portion of the filter;

Figure 6 is a plan view, partly in section, of one element of the invention, and Figure 7 is a perspective view of the trap as it would appear removed from the filter casing.

Referring more specifically to the drawings, the filter and trap in its entirety and constituting the invention is designated generally 8 and includes an elongated housing or casing 9 having an open top 10 which is normally closed by a cover 11. The cover 11 is detachably secured to the open top of the casing 9 by a plurality of threaded fastenings 12. A sealing gasket 13 is interposed between the open top of the casing 9 and cover 11 to prevent leakage of a liquid between the top of the casing and said cover.

One end wall 14 of the housing or casing 9 is provided with an externally extending boss 15 having a bore 16 extending therethrough and through the end wall 14. The boss 15 is preferably provided with an outturned flange 17 at its outer end by means of which a conduit or conduit section, not shown, is fastened to the boss 15 so that the bore 16 constitutes the inlet of the filter and trap 8. The opposite end wall 18 of the housing 9 is provided with a relatively large externally flanged opening 19, constituting the outlet and thereof, to the outer side of which wall a conduit, not shown, is adapted to be secured around said outlet opening. It will thus be seen that the housing or casing 9 may be interposed in a liquid supply conduit or system with the boss 15 attached to the conduit portion leading from a supply source and the end wall 18 attached to the portion of the conduit or system leading to its outlet or discharge.

As best illustrated in Figure 4, the wall 14 is provided on its inner side and around the opening 16 with a substantially U-shaped strip 20 which is secured thereto by fastenings 21. As seen in Figures 1 and 2, the inner edge portion 22 of the strip 20, from end-to-end thereof is inwardly offset away from the inner face of the wall 14 to combine therewith to form an upwardly opening substantially U-shaped retaining groove or channel 23.

A trap, designated generally 24 is mounted in the housing 9, near to but spaced from its end wall 18 and is rigidly supported in and secured to the housing 9 by means of a plurality of supporting arms or brackets 25, each of which has an inner end secured to the trap 24 and an outer end secured to the housing 9. As seen in Figures 1 and 2, a plurality of the arms or brackets 25 are secured to the end wall 18 around its outlet opening 19. The trap 24 has an enlarged open end 26 extending and opening away from the outlet 19. A clean out pipe or conduit 27 opens into the trap 24 through a side wall thereof and extends outwardly from the trap 24 through a side wall of the housing 9. The clean out conduit 27 is provided with a manually controlled shutoff valve, such as a gate valve 28, located externally of the housing 9. The trap 24 is closed except for its open inner end 26 and the clean out conduit 27. As seen in Figure 7, the trap 24 is provided with an integral U-shaped enlargement 29 at its open inner end 26. Said U-shaped enlargement 29 has upstanding substantially parallel legs 30 which extend upwardly from opposite sides of the open end 26. The inner side of the enlargement 29 is grooved from end-to-end thereof to provide a U-shaped upwardly opening groove or channel 31, corresponding in size to the groove or channel 23.

The filter and trap 8 includes a pair of corresponding filter element supports, designated generally 32 and 33, which are identical in construction so that only one of which need be described in detail. The filter support 32, for example, as best illustrated in Figure 6, includes a substantially flat plate 34 having a substantially semicircular bottom portion 35. An outer annular flange 36 projects from one side of the plate 34 and is disposed concentrically around an inner annular flange 37 of said plate and is spaced therefrom. The plate 34 is open from the interior surface of the outer flange 36 to its center, except for the inner flange 37 and a plurality of radial ribs 38, which preferably form integral portions of the plate 34 and are secured to and extend between the flanges 36 and 37 for supporting the inner flange 37. The flange 37 defines a relatively large central opening 39 of the support 32, and said support is provided with a plurality of circumferentially spaced openings 40 disposed between the flanges 36 and 37 and the ribs 38. The flanges 36 and 37 are provided with sockets 41 which are circumferentially spaced and which open outwardly of their edges but which may assume the form of circumferentially spaced grooves in the outer or peripheral surfaces of said flanges. The holder 32 is illustrated in Figure 6, as provided with sockets 41 whereas the flanges of the holders 32 and 33 are illustrated in Figure 5 as provided with grooves 41a in the peripheries thereof in lieu of said sockets 41.

The two filter supports 32 and 33 combine to support two cylindrical filter screens 42 and 43 and a cage, designated generally 44, for rigidifying the filter screens between the supports 32 and 33. The cage 44 is composed of a plurality of rods 45 of uniform length the ends of which engage either in the sockets 41 or in the grooves 41a. The cylindrical filter screen 43 is of larger diameter than the filter screen 42 but of finer gauge or mesh. To assemble the filter screens, cage and supports, corresponding ends of the rods 45 are fitted into the sockets 41 or grooves 41a of the flanges 36 and 37 of either the support 32 or 33. The filter screen 42 is then applied over the rods 45 which engage the inner flange 37 and over said inner flange of the selected support. The outer filter screen 43 is then similarly applied over the outer series of circumferentially spaced rods 45 and over the outer flange 36. The other support 32 or 33 is then positioned so that its sockets 41 or grooves 41a will engage the opposite ends of the rods 45 and so that the opposite ends of the screens 42 and 43 will engage the flanges 37 and 36, respectively, thereof. Accordingly, the ends of the two screens 42 and 43 engage on and are supported by the two inner flanges 37 and outer flanges 36, respectively, of the supports 32 and 33. The portions of the screens 42 and 43 which extend between the flanges 36 and 37 are supported by the rods 45 which extend through and engage against the inner sides of said screens and which are supported at their ends by the flanges 36 and 37. The assembled filter unit as illustrated in Figure 5 is then inserted through the open top 10 of the housing 9, assuming the cover 11 to be removed. The overall length of the filter unit between the plates 34 of the supports 32 and 33 corresponds to the distance between the grooves or channels 23 and 31 so that as the filter unit of Figure 5 is inserted downwardly into the housing 9 with the bottom portions 35 of the plates 34 in bottommost leading positions, said bottom portions and thereafter the side edge of the plates 34 will enter one in the groove or channel 23 and the other in the groove or channel 31. When the supports 32 and 33 are fully seated in said channels 23 and 31 and with the bottom portions thereof in fitting engagement in the bottoms of said channels, the opening 39 defined by the inner flange 37 of the support which is mounted in the channel 23, as for example the support 32, will be in registration with the bore 16, as illustrated in Figure 2. The openings 40 of this support 32 will be closed by the portion of the wall 14 disposed immediately around the opening 16. The other support 33 which is mounted in the channel 31 will have both its opening 39 and its openings 40 in communication with the interior of the trap 24 and in registration with its open end 26.

Assuming that the filter unit of Figure 5 has thus been applied to the casing 9, as illustrated in Figures 1 and 2 and that the cover 11 has been replaced so that the open top of the casing is sealed by said cover and the gasket 13, and further assuming that the unit 8 is interposed in a conduit or flow line, as for example a sprinkler system, and that the valve 28 is in a closed position, water from the source of supply of the sprinkler 50, not shown, will enter the casing 9 through its inlet opening 16. Assuming that the water contains dirt, weed seed or other foreign matter, the water in entering the casing will flow only through the opening 39 and the inner flange 37 of the support 32, located against the wall 14, so that all of the water will initially enter the inner bore defined by the inner screen 42. A part of the water will pass outwardly through this screen into the annular space between the screens and thence outwardly through the outer screen 43. However, dirt, weed seed and other foreign matter will be conveyed by another part of the water lengthwise through the inner coarse mesh screen 42 and into the trap 24 and some of the foreign matter which is capable of passing through the coarse screen 42 but incapable of passing the fine mesh screen 43 will pass longitudinally through the space between the screens through one or more of the openings 40 into the trap 24. Additionally, the water which washes the dirt and foreign matter along the screens through the openings 39 or 40 into the trap 24 will escape back from the trap ordinarily through the openings 40 and thence outwardly through the outer screen 43. The water or liquid thus filtered after passing outwardly through the screen 43 will pass along the housing 9 around the exterior of the trap 24 and outwardly through the outlet 19. Dirt, weed seed and other foreign matter will accumulate in the interior of the trap 24 and in the conduit portion 27. Accordingly, at any time without shutting off the flow through the filter 8, the trap 24 may be cleansed, if desired, by merely opening the valve 28 and allowing the foreign matter to be flushed outwardly through the outlet 27 by the water pressure within the filter. On the other hand, the cover 11 may be removed and the unit of Figure 5 then removed from the casing 9 for thoroughly and effectively cleaning the filter screens 42 and 43 and for exposing the interior of the trap 24 so that it may be thoroughly cleaned, this being accomplished while the flow through the filter is shut off.

Various modifications and changes are contemplated and may obviously be resorted to, without departing from the spirit or scope of the invention as hereinafter defined by the appended claims.

I claim as my invention:

1. A liquid filter and dirt trap comprising an elongated casing having an inlet opening at one end thereof and an outlet opening at its opposite end, a trap for dirt and foreign matter secured in said casing adjacent its outlet end and having an open end opening away from said outlet end, a filter unit mounted in said casing and extending between its inlet end and the open end of said trap, said filter unit including an inner filter element and an outer filter element, said outer filter element being disposed around and spaced from the inner filter element, said inner filter element defining a bore having one end communicating with said inlet of the casing and its opposite end opening into the trap, said outer filter element having one end opening into the trap and being closed at its opposite end around the inner filter element, a normally closed outlet communicating with and leading from the trap having a discharge end disposed externally of the casing, and means detachably mounting one end of said filter unit in the casing against the end wall of the casing provided with said inlet opening and the other end of the filter unit in the open end of said trap, said casing including a removable top wall, the end walls of said casing being integrally connected to one another and to the trap, and said means supporting the filter unit for sliding movement transversely of the casing into and out of the casing through the top thereof when the top wall is removed.

2. A liquid filter and dirt trap comprising an elongated casing having an inlet opening at one end thereof and an outlet opening at its opposite end, a trap for dirt and foreign matter secured in said casing adjacent its outlet end and having an open end opening away from said outlet end, a filter unit mounted in said casing and extending between its inlet end and the open end of said trap, said filter unit including an inner filter element and on outer filter element, said outer filter element being disposed around and spaced from the inner filter element, said inner filter element defining a bore having one end communicating with said inlet of the casing and its opposite end opening into the trap, said outer filter element having one end opening into the trap and being closed at its opposite end around the inner filter element, a normally closed outlet communicating with and leading from the trap having a discharge end disposed externally of the casing, and means detachably mounting one end of said filter unit in the casing against the end wall of the casing provided with said inlet opening and the other end of the filter unit in the open end of said trap, said filter unit including a pair of filter element supports each including a plate having a pair of flanges projecting from one side thereof, said filter elements having ends engaging around said flanges and supported thereby, said plates each being open within its inner flange and having a plurality of openings between the flanges thereof, and channel means connected to the casing and to said trap for receiving edge portions of the plates for detachably mounting said supports, the inner and outer openings of one of said plates registering with the open end of said trap, the inner opening of the other plate being in communication with the casing inlet, and the outer openings of the last mentioned plate being closed by a wall of said casing.

3. A filter and trap as in claim 2, and a plurality of rods forming a cage including an inner set of rods detachably supported at their ends by the inner flanges around which the inner filter element is disposed and supported between the inner flanges, other of said rods being detachably supported at their ends in the outer flanges and around which the outer filter element is disposed and supported between the outer flanges.

References Cited in the file of this patent

UNITED STATES PATENTS

| Number | Name | Date |
|---|---|---|
| 520,293 | Blackmore | May 22, 1894 |
| 864,345 | Tollefson | Aug. 27, 1907 |
| 1,223,299 | Taylor | Apr. 17, 1917 |
| 1,793,080 | Glover | Feb. 17, 1931 |
| 2,390,841 | Longden | Dec. 11, 1945 |

FOREIGN PATENTS

| Number | Country | Date |
|---|---|---|
| 320,967 | Great Britain | Oct. 31, 1929 |